(12) United States Patent
Ladd et al.

(10) Patent No.: US 8,090,617 B1
(45) Date of Patent: Jan. 3, 2012

(54) DETERMINING IF A POTENTIAL CUSTOMER IS A DESIRABLE CUSTOMER

(75) Inventors: Barton H. Ladd, Santa Clara, CA (US); Mir M. Baqar, Sunnyvale, CA (US); June S. Ellern, Lake Oswego, OR (US); Tadashi Fujita, Kawasaki (JP); Priya R. Iyer, Fairfax, VA (US); Gaku Ogura, Yokosuka (JP); Akikazu Yada, Setagaya-ku (JP); Nobuaki Yamamori, Sagamihara (JP)

(73) Assignee: Renesas Electronics America Inc., Santa Clara, CA (US)

( * ) Notice: Subject to any disclaimer, the term of this patent is extended or adjusted under 35 U.S.C. 154(b) by 3056 days.

(21) Appl. No.: 09/939,949

(22) Filed: Aug. 27, 2001

(51) Int. Cl.
*G06Q 30/00* (2006.01)
*G06F 17/50* (2006.01)

(52) U.S. Cl. ............................. 705/26; 716/19
(58) Field of Classification Search .................. 705/26
See application file for complete search history.

(56) References Cited

U.S. PATENT DOCUMENTS

| | | | |
|---|---|---|---|
| 6,038,597 A * | 3/2000 | Van Wyngarden | 709/219 |
| 6,073,112 A * | 6/2000 | Geerlings | 705/14.53 |
| 6,112,188 A * | 8/2000 | Hartnett | 705/36 R |
| 6,236,975 B1 * | 5/2001 | Boe et al. | 705/7.32 |
| 6,282,518 B1 * | 8/2001 | Farrell et al. | 705/27.1 |
| 6,405,202 B1 * | 6/2002 | Britton et al. | 1/1 |
| 6,542,897 B2 * | 4/2003 | Lee | 1/1 |
| 6,587,836 B1 * | 7/2003 | Ahlberg et al. | 705/26.35 |
| 6,622,295 B1 * | 9/2003 | Schepp et al. | 716/55 |
| 6,631,453 B1 | 10/2003 | Friday | 711/163 |
| 6,641,037 B2 | 11/2003 | Williams | 235/383 |
| 6,643,561 B1 | 11/2003 | Torvinen | 700/166 |
| 6,650,736 B1 * | 11/2003 | Unger et al. | 379/88.02 |
| 6,658,568 B1 | 12/2003 | Ginter et al. | 713/193 |
| 6,697,824 B1 | 2/2004 | Bowman-Amuah | 707/229 |

* cited by examiner

*Primary Examiner* — Garcia Ade
(74) *Attorney, Agent, or Firm* — Campbell Stephenson LLP

(57) ABSTRACT

A method is taught of determining if a potential customer is a desirable customer. The manufacturer can determine if the potential customer is a potential competitor. If the potential customer can receive technical information from the potential customer and provide a price quotation for certain goods (or services). The manufacturer can determine if the potential customer intends to use a product other than for its intended application. In an embodiment, the potential customer can initially contact the manufacturer through an electronic communication network.

In accordance with one feature of the invention, a design is prepared. The design can be prepared in cooperation between the manufacturer and the potential customer or a third party can be included. In accordance with another feature, the potential customer can agree not to disclose technical information. In accordance with a feature of the invention the manufacturer can communicate with the potential customer and internal organizations as the method progresses. In accordance with a feature of the invention, a customer can track work-in-progress after manufacturing has begun. A feature also allows a customer to approve a sample received from the manufacturer.

3 Claims, 18 Drawing Sheets

Step 3

| | |
|---|---|
| Project Name | [____] |
| Size of Business Opportunity for first 2 years | [____] Units |
| NEC ASIC Customer? | ○ Yes ○ No  ← 710 |
| Distribution Reference Number | [____] |

Step 4

🛈 User Login Registration - This ID and Password will be used to create your user login account. You will need to remember them when you return to the Gate Array Configuration Web site.

| | | |
|---|---|---|
| Create a User ID | [____] | |
| Create Login Password | [____] | (Minimum of 6 characters) |
| Confirm Login Password | [____] | |

[SUBMIT]

FIG. 7B

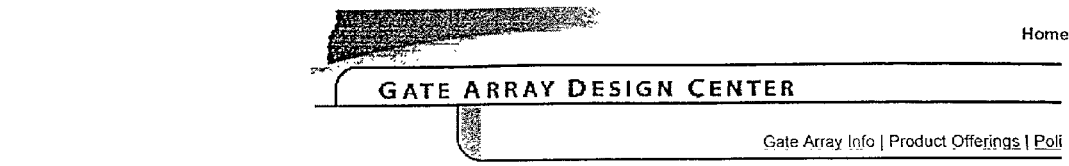

Gate Array Info | Product Offerings | Poli

Internet Gate Array Design Center

Welcome to the    Internet Gate Array Design Center process!

There are several sections from the start to finish:

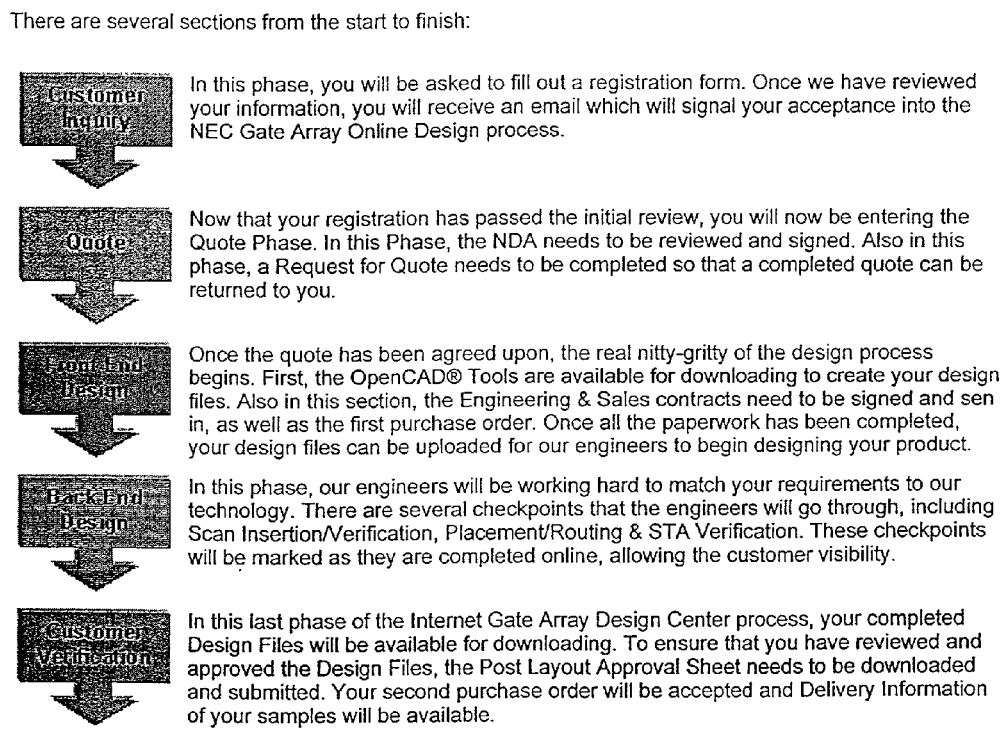

In this phase, you will be asked to fill out a registration form. Once we have reviewed your information, you will receive an email which will signal your acceptance into the NEC Gate Array Online Design process.

Now that your registration has passed the initial review, you will now be entering the Quote Phase. In this Phase, the NDA needs to be reviewed and signed. Also in this phase, a Request for Quote needs to be completed so that a completed quote can be returned to you.

Once the quote has been agreed upon, the real nitty-gritty of the design process begins. First, the OpenCAD® Tools are available for downloading to create your design files. Also in this section, the Engineering & Sales contracts need to be signed and sen in, as well as the first purchase order. Once all the paperwork has been completed, your design files can be uploaded for our engineers to begin designing your product.

In this phase, our engineers will be working hard to match your requirements to our technology. There are several checkpoints that the engineers will go through, including Scan Insertion/Verification, Placement/Routing & STA Verification. These checkpoints will be marked as they are completed online, allowing the customer visibility.

In this last phase of the Internet Gate Array Design Center process, your completed Design Files will be available for downloading. To ensure that you have reviewed and approved the Design Files, the Post Layout Approval Sheet needs to be downloaded and submitted. Your second purchase order will be accepted and Delivery Information of your samples will be available.

Once all these phases have been completed, your product will be in Mass Production! Throughout the proc you will have email contacts with your primary design engineer as well as your primary salesperson.

Thank-you for choosing NEC Electronics Inc. to design your product!

DETERMINING IF A POTENTIAL CUSTOMER IS A DESIRABLE CUSTOMER

RESERVATION OF COPYRIGHT

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

COMPUTER PROGRAM LISTING

Attached herewith as Appendix A is a CD-ROM (and duplicate) containing a single file. The file is titled "GA source code." The source code on the attached CD-ROM is herewith incorporated by reference for all purposes. Specifically, the copyright is reserved in the computer code within Appendix A.

BACKGROUND OF THE INVENTION

This application relates to co-pending U.S. patent application Ser. No. 09/939,909, filed on Aug. 27, 2001, entitled "Website for Facilitating a Transaction" naming Barton H. Ladd, Priya R. Iyer, June S. Ellern, Mir M. Baqar, Akikazu Yada, Gaku Ogura, Tadashi Fujita and Novuaki Yamamori as inventors, which is assigned to the assignee of this application, the application being hereby incorporated herein by reference in its entirety.

This application relates to co-pending U.S. patent application Ser. No. 09/940,171, filed on Aug. 27, 2001, entitled "Method Of Providing A Price Quotation" naming Barton H. Ladd, Priya R. Iyer, June S. Ellern, Mir M. Baqar, Akikazu Yada, Gaku Ogura, Tadashi Fujita and Nobuaki Yamamori as inventors, which is assigned to the assignee of this application, the application being hereby incorporated herein by reference in its entirety.

This application relates to co-pending U.S. patent application Ser. No. 09/939,920, filed on Aug. 27, 2001, entitled "A Method of Facilitating a Design" naming Barton H. Ladd, Priya R. Iyer, June S. Ellern, Mir M. Baqar, Akikazu Yada, Gaku Ogura, Tadashi Fujita and Nobuaki Yamamori as inventors, which is assigned to the assignee of this application, the application being hereby incorporated herein by reference in its entirety.

This application relates to co-pending U.S. patent application Ser. No. 09/940,084, filed on Aug. 27, 2001, entitled "A Method to Facilitate a Sale" naming Barton H. Ladd, Priya R. Iyer, June S. Ellern, Mir M. Baqar, Akikazu Yada, Gaku Ogura, Tadashi Fujita and Nobuaki Yamamori as inventors, which is assigned to the assignee of this application, the application being hereby incorporated herein by reference in its entirety.

FIELD OF THE INVENTION

The present invention relates to a method of facilitating a commercial transaction. More specifically the present invention relates to a method of determining if a potential customer is a desirable customer.

DESCRIPTION OF THE RELATED ART

With the advent of the Internet, a wide array of information has become even more accessible to the average person. Entities distributing product information, either to the public or to other businesses have been assisted in their endeavor by networking and client/server technology that has become available in approximately the last ten to fifteen years. Such client/server technology typically allows a number of users employing client terminals to communicate with a remote server in order to transfer information.

To facilitate such transfers, client terminals can employ a "web" browser that provides access to a server via a graphical user interface (GUI). The server responds to requests from the client by providing information in the form of a "web page." One popular collection of servers uses Hypertext Transfer Protocol (HTTP) to provide information. This assemblage is known as the "World Wide Web" (WWW). A collection of related web pages is often referred to as a "website," or more simply a "site." The information is typically presented as web pages written as text with standardized formatting and control symbols known as Hypertext Mark-up Language (HTML).

The Internet allows a plurality of users employing client terminals communicating with a remote computer to transfer information. The proliferation of the Internet provides companies the opportunity to quickly and efficiently communicate with potential purchasers. The Internet also allows the seller to quickly update prices offered to its customers to reflect market conditions. The Internet also allows a seller to offer certain prices to a specific customer or group of customers.

Purchasers increasingly provide specifications to a manufacturer prior to obtaining a price quotation. For example, a manufacturer can use the information provided by the purchaser to design an integrated circuit. In another example, the manufacturer and potential customer can design an integrated circuit cooperatively. After receipt of the integrated circuit specification, the manufacturer can develop a price quotation.

For competitive reasons a company may limit the distribution of its prices and other sensitive data. Utilizing the communication facilities of the Internet a company can decide to allow a potential customer to obtain a price for a product but the vendor can decide not to make that information available to a competitor. With the rapid development of the Internet and Internet communications a manufacturer/vendor can decide to accept specifications and provide a price quotation to selected customers with the transaction facilitated by the Internet.

Utilizing the Internet to exchange information with a potential purchaser enables certain other advantages. For example, a manufacturer can request information from a customer and review the information before entering into a transaction with a new or repeat customer. For example, a manufacturer can provide a password to a potential customer allowing the customer to access a manufacturer's extranet.

Typically, price information of certain manufactured goods (integrated circuit chips in general and gate arrays in particular) is confidential. Keeping pricing information confidential prevents competitors from gaining a marketing advantage based on sensitive information.

However, the Internet also allows an exchange of information between a manufacturer and a potential customer. What is needed is a means to verify a customer's identity before exchange of information between a potential customer and a vendor. More specifically, what is needed is a means to identify a customer and accept information from the customer before providing a price quotation to the customer based on a specification provided by the customer.

SUMMARY OF THE INVENTION

In accordance with the present invention, a method is taught of determining if a potential customer is a desirable customer. The potential customer provides identifying information (e.g., name, location, industry, etc.) to a manufacturer. The manufacturer can determine if the prospective customer is a potential competitor. If the customer is not a potential competitor the manufacturer can receive technical information from the potential customer and provide a price quotation for certain goods (or services). In an embodiment, the potential customer can initially contact the manufacturer through an electronic communication network such as the Internet. Similarly, in an embodiment, the price quotation can be provided by the manufacturer to the potential customer over the same electronic communication network (the Internet) or another electronic communication network, such as a conventional telephone or an extranet.

In accordance with one feature of the invention, a design is developed. The design can be prepared in cooperation between the manufacturer and the potential customer. Alternatively, a third party can be included to participate in some design functions. According to another feature the potential customer can verify the design before any goods are manufactured.

In accordance with another feature, the potential customer can agree not to disclose technical information. This type of agreement is typically referred to as a non-disclosure agreement. According to this feature, the method does not proceed until a signed agreement is received from the potential customer.

In accordance with a feature of the invention the manufacturer can communicate with the potential customer and internal organizations (such as sales, marketing, engineering, etc.) as the method progresses. In addition each organization can communicate directly with another organization and each organization can communicate directly with the potential customer. The communications between organizations can be stored for future reference. Similarly, the communications between organizations and the customer can be stored for future reference.

In accordance with a feature of the invention, a customer can track work-in-progress after manufacturing has begun. The method can allow a customer to track goods shipped from the manufacturer to the customer. A feature also allows a customer to approve a sample received from the manufacturer.

Another feature of the invention allows a manufacturer to provide a potential customer with a quote for goods or services. According to this feature, the potential customer can accept or reject the quote. Accepting the quote results in a contract to sell the goods or services under discussion. The offer and acceptance can be communicated over an electronic communication network such as the Internet or an extranet.

The foregoing is a summary and this contains, by necessity, simplifications, generalizations and omissions of detail; consequently, those skilled in the art will appreciate that the summary is illustrative only and is not intended to be in any way limiting.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7A and FIG. 7B show an initial screen presentation suitable to execute the method disclosed.

FIG. 8 shows a screen presentation suitable for informing a potential customer of the nature and function of the website FIGS. 9A-E shows a screen presentation suitable for use by a potential customer in requesting a quote.

DETAILED DESCRIPTION

The following sets forth a detailed description of a mode for carrying out the invention. The description is intended to be illustrative of the invention and should not be taken to be limiting. A method is taught of determining if a potential customer is a desirable customer. A potential customer can contact a manufacturer (or other vendor) by conventional means such as mail, fax, email or through an electronic network. An example of an electronic network is the Internet, further described in FIG. 1, below.

Figure 1:
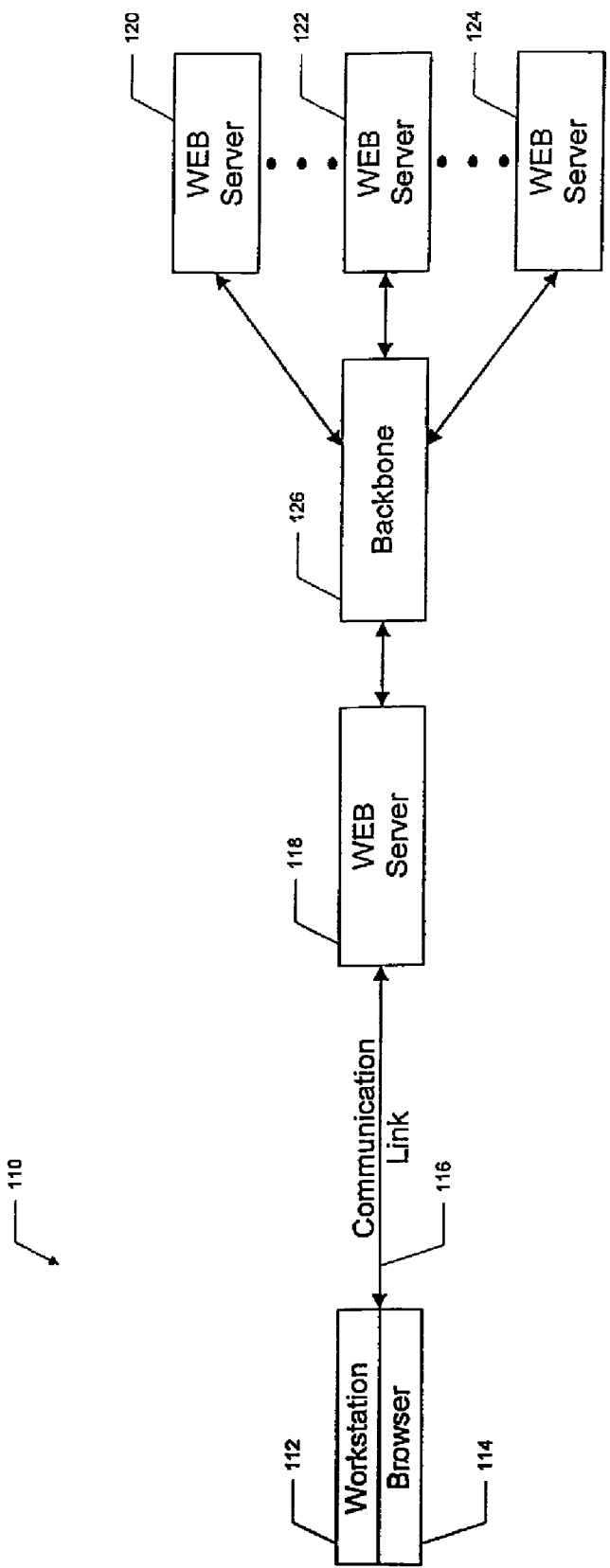
FIG. 1 is a block diagram illustrating a network environment in which embodiments of the present invention may be practiced.

FIG. 1 shows an example of a typical network connection. A user, (such as a potential customer, client, or other interested party) that wishes to obtain a price quote can have a workstation, 112. Workstation 112 typically executes an application program known as a web browser 114. Workstation 112 establishes a communication link 116 with web server 118 such as a dial-up wired connection with a modem, a direct link such as a T1 or ISDN line, a wireless connection through a cellular or satellite network. When the user enters a request for information by entering commands in web browser 114, workstation 112 sends a request for information, such as a search for documents pertaining to a specified topic, to server 118. In the following description the Internet is used as an example of a network, however this should not be taken to be limiting. However, the invention discloses a process applicable to a communication network such as internal corporate networks (intranets) and extensions of intranets to allow outside access (extranets) and other networks such as virtual private networks (VPN).

Figure 2:
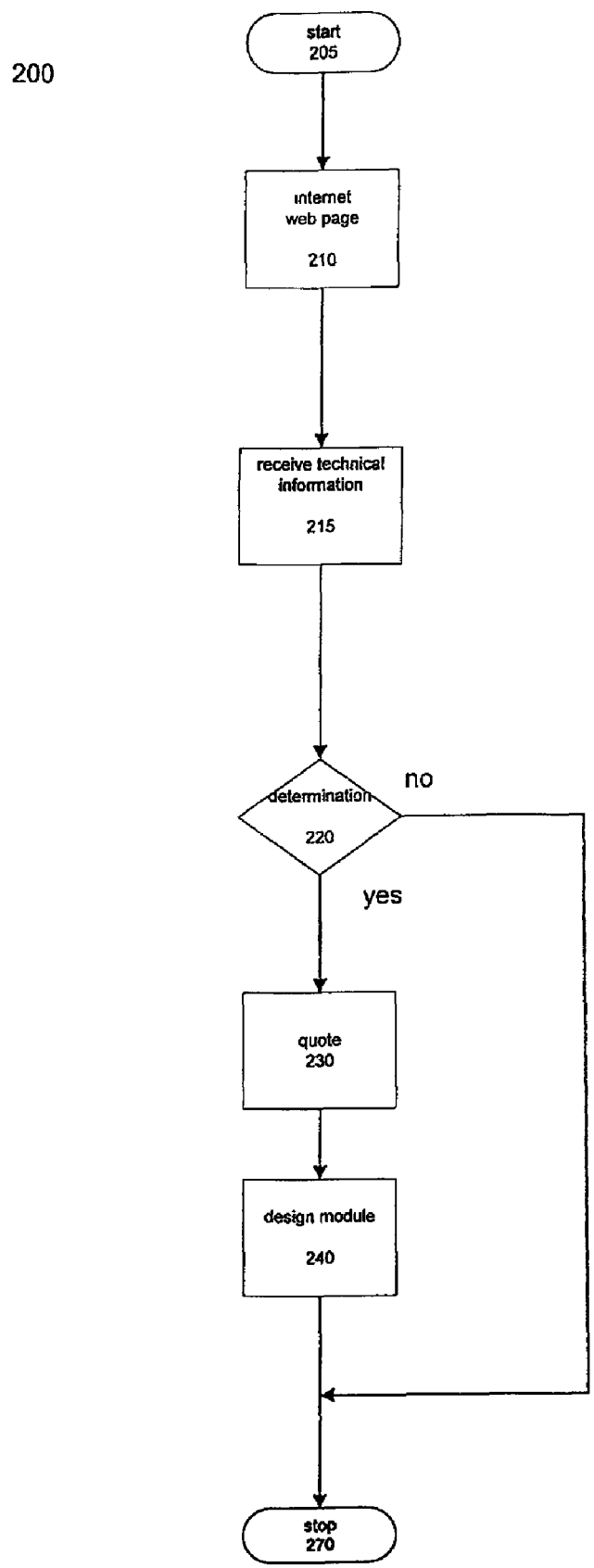
FIG. 2 is a flow diagram of the method showing the logical steps of identifying a customer and a design module.

FIG. 2 shows the logical steps of a method of determining if a potential customer is a desirable customer. A potential customer is a customer who contacts the vendor in order to obtain a price quotation for a product (or service). A potential customer can be a corporation, individual or other entity. A potential customer can contact the manufacturer by any conventional means such as fax, email, telephone, surface mail or through the website as previously discussed (refer to FIG. 1). In the embodiment shown in FIG. 2, the determination of whether a potential customer is a desirable customer can be made before a price is quoted to the potential customer. The products for which prices are to be provided are not limited. Prices can be provided for any product, method, service, business or industry. A password can be provided to the customer to facilitate future transactions. The password can also allow the potential customer access to a manufacturer's electronic communications, such as an extranet.

As shown in FIG. 2, the process can begin with start 205. From start 205 a potential customer can logon to an Internet web page, 210. The web page can be provided, operated or maintained by a manufacturer or other vendor. (Hereinafter "manufacturer" is used to refer to a manufacturer, vendor or distributor of a good or service). At the web page a potential customer can enter certain information; such as name, address, phone number and individual contact name. In addition, the identifying information provided by a potential customer can include one or more of the following: business size, project name, password, or user identification number.

From Internet website 210 the method can proceed to receive technical information, 215. In a logical step denoted as receive technical information 215, a potential customer can provide technical data regarding a product for which the potential customer is interested in obtaining a price quotation. In an embodiment of the method (shown in FIG. 6) the customer can be interested in obtaining a quote for goods or services. (Hereinafter "goods" refers to goods and services.) As discussed previously, the goods to be purchased are not limited to one industry but can include an integrated circuit such as a gate array. Examples of the type of technical information provided by the customer in logical step 215 are provided in FIG. 7, as described further below. Additional technical information can be provided by the customer in FIGS. 9A-E, also described below.

From receive technical information 215 the method can proceed to determination, 220. At determination 220, the method determines if the potential customer is a desirable customer. In one embodiment the method compares the information entered on the web page to a list of competitors. If the information entered on Internet website 210 corresponds to a competitor, the method continues from determination 220 to stop, 270. If the information entered in Internet website 210 does not correspond to a competitor (or potential competitor) the method can proceed to design module 240. In an embodiment, after determining a potential customer is not a potential competitor a web master can route the query from the potential customer to a sales channel, such as direct sales or distribution. A direct sales channel can be an organization of employees of the manufacturer (or vendor). A distribution sales channel can be an independent company that purchases the manufacturer's (or vendor's) products for resale.

Determination 220 can determine if the potential customer plans to use the product in an application other than the product's intended application. For example, a manufacturer of integrated circuit chips may have a corporate policy preventing use of its chips in life-sustaining medical devices. Use of integrated circuit chips in life-sustaining medical devices typically requires a reliability far greater than the reliability suitable for many other applications. Under certain circumstances an integrated circuit chip with less than the desired reliability could result in the loss of life if incorporated in a medical device having a life sustaining application. Determination 220 can identify potential applications not compatible with the design of the integrated circuit (or other product) before providing a price quotation.

From determination 220 the method proceeds to quote, 230. In quote 230 the manufacturer provides a price quotation to the potential customer. The price quotation provided is calculated based on the technical information received in logical step 215. For example, if the product is in integrated circuit such as a gate array, the price quotation can consider the number of gates, macros, speed, package and power consumption of the chip. However, as discussed in FIG. 4B, below, the price quotation can also depend on other factors, such as previous transactions between the manufacturer and the potential customer. In another example, the potential quantity ordered can be considered in developing the price quotation.

From quote 230 the method proceeds to design module 240. Design module 240 produces a design based on the information received from the potential customer. Design module 240 can produce a design by manual means, electronic design automation (EDA) tools, a combination of manual and EDA, or other means. In an embodiment further discussed in FIG. 3, a design is cooperatively developed by the manufacturer and potential customer (hereinafter referred to simply as a "customer").

Figure 3:
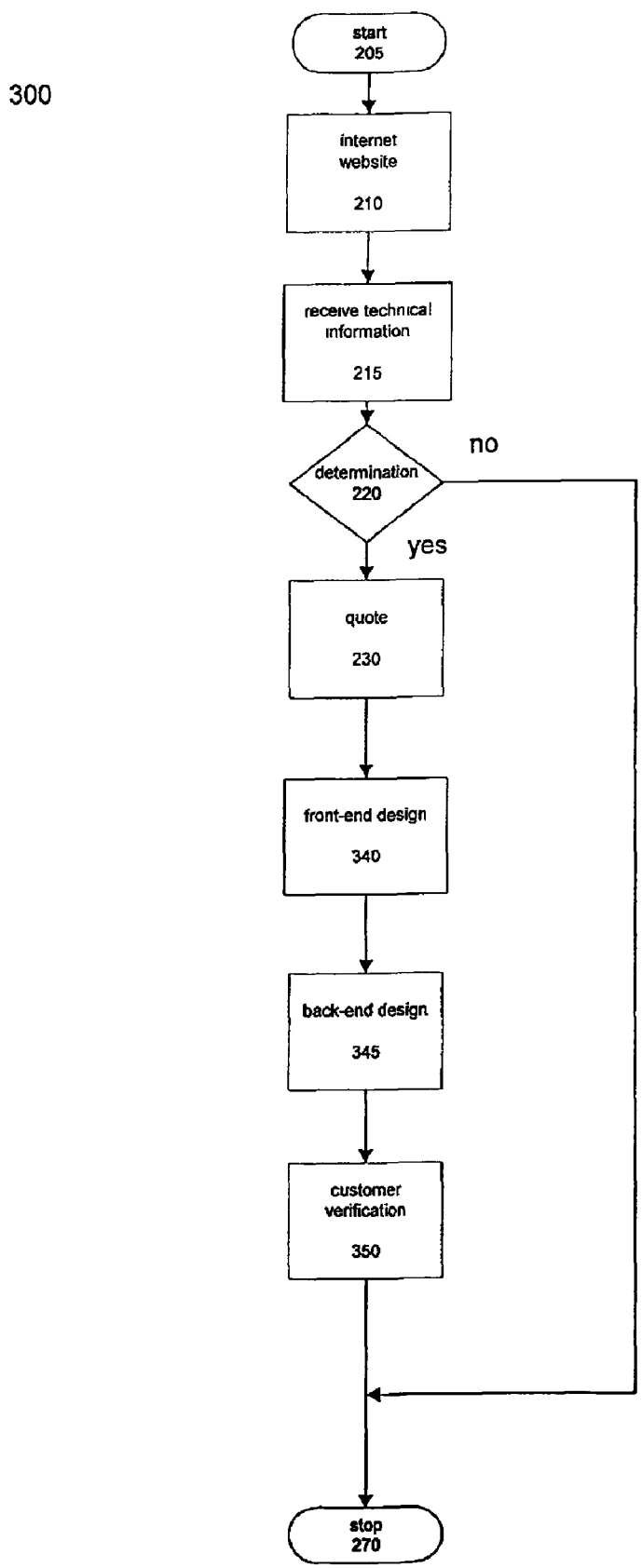
FIG. 3 is a flow diagram of the method depicting additional logical steps of a front-end design, a back-end design and a customer verification of the design.

As mentioned in the preceding paragraph, a design can be produced by more than one entity. For example, a design can be cooperatively produced by a customer and a manufacturer. In one alternative (not shown), the design process can also include participation by a third party. Logical step 340 is shown in FIG. 3 depicting a front-end design prepared by the customer. In an embodiment wherein the product under discussion is an integrated circuit such as a gate array a customer can use EDA tools provided by the manufacturer to prepare a front-end design of the gate array (or other integrated circuit). In an embodiment OpenCAD® Tools are provided to the customer by the manufacturer. Typically the software tools can be downloaded by the customer over the Internet.

After the customer provides information defining the function of the integrated circuit the manufacturer or a third party can complete the design. In addition to the front-end design provided by a potential customer a back-end design is typically required for an integrated circuit. The back-end design can be completed by the manufacturer or a third party. Referring to FIG. 3, back-end design 345 is shown. Back-end design 345 includes, but is not limited to, layout, placement and routing. Back-end design 345 formats the customer's design into the manufacturer's proprietary design.

These design steps can be performed by proprietary design tools or commercially available design tools such as Verilog originally designed by Gateway Design Automation in 1985. Other vendors of EDA tools are: Cadence Corporation, Providence, R.I.; Mentor Graphics, Oregon; Snyopsys, California; and Snytest Technologies, Inc. California.

Figure 4A:
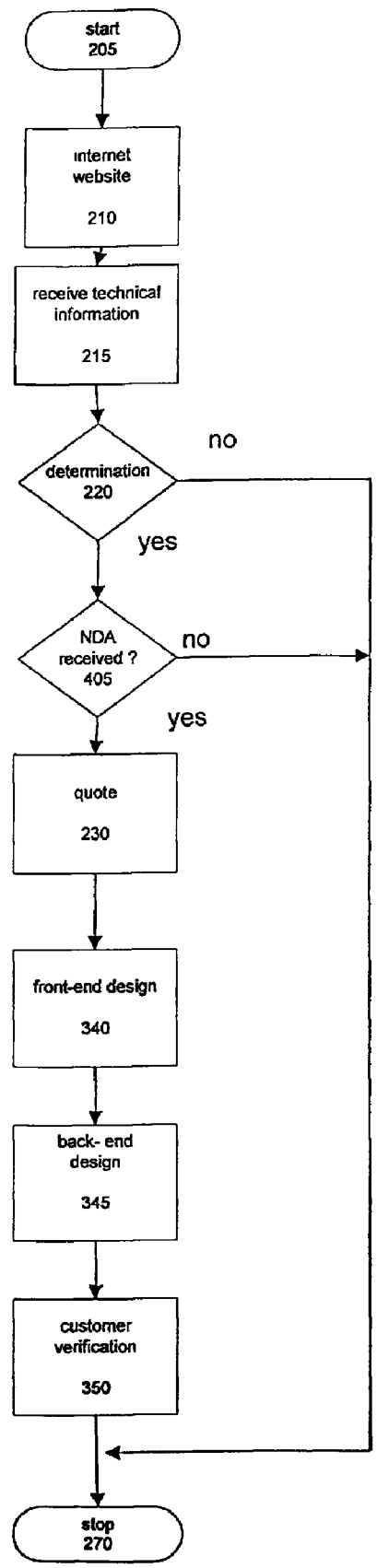
FIG. 4A is a flow diagram of the method depicting the additional logical step of receiving a non-disclosure agreement ("NDA").

FIG. 4A is a flow diagram of the method showing the additional logical step of receiving a non-disclosure agreement ("NDA"). An NDA is an agreement between the manufacturer and the potential customer. When approving an NDA the parties typically agree not to disclose confidential information provided by the other party. NDAs are common in technical industries such as the computer industries. NDAs facilitate business transactions by allowing parties to disclose technical information by lessening the concern that the technical information will be acquired or misappropriated by a competitor. In one possible configuration as shown in FIG. 4A, the logical flow from determination 220 continues to NDA received 405 (not to quote 230 as previously shown in FIG. 2).

After determining if an NDA has been received the method can proceed to either quote 230 or stop, 270. If an NDA has been received the logical method proceeds to quote 230 as indicated by the "yes" adjacent to logical step 405 in FIG. 4A. If an NDA is not received, the method can proceed to stop 270 as indicated by the "no" adjacent to logical event 405 in FIG. 4A.

From quote 230 the method proceeds to font-end design 340 shown in FIG. 4A (and as previously discussed in FIG. 3). From front-end design 340 the logical method proceeds to back-end design 345 as shown in FIG. 4A (and as previously discussed in FIG. 3). From back-end design 345 the logical method proceeds to customer verification, 350. Verification 350 allows completed design files to be verified by the customer. For example, the customer can verify the completed design to ensure that timing constraints have been satisfied. Subsequent to verifying the design a customer can provide a purchase order for a product to be manufactured. From customer verification 350 the method can proceed to stop, 270. In the alternative, other features of the method are further described in FIG. 4B.

Figure 4B:
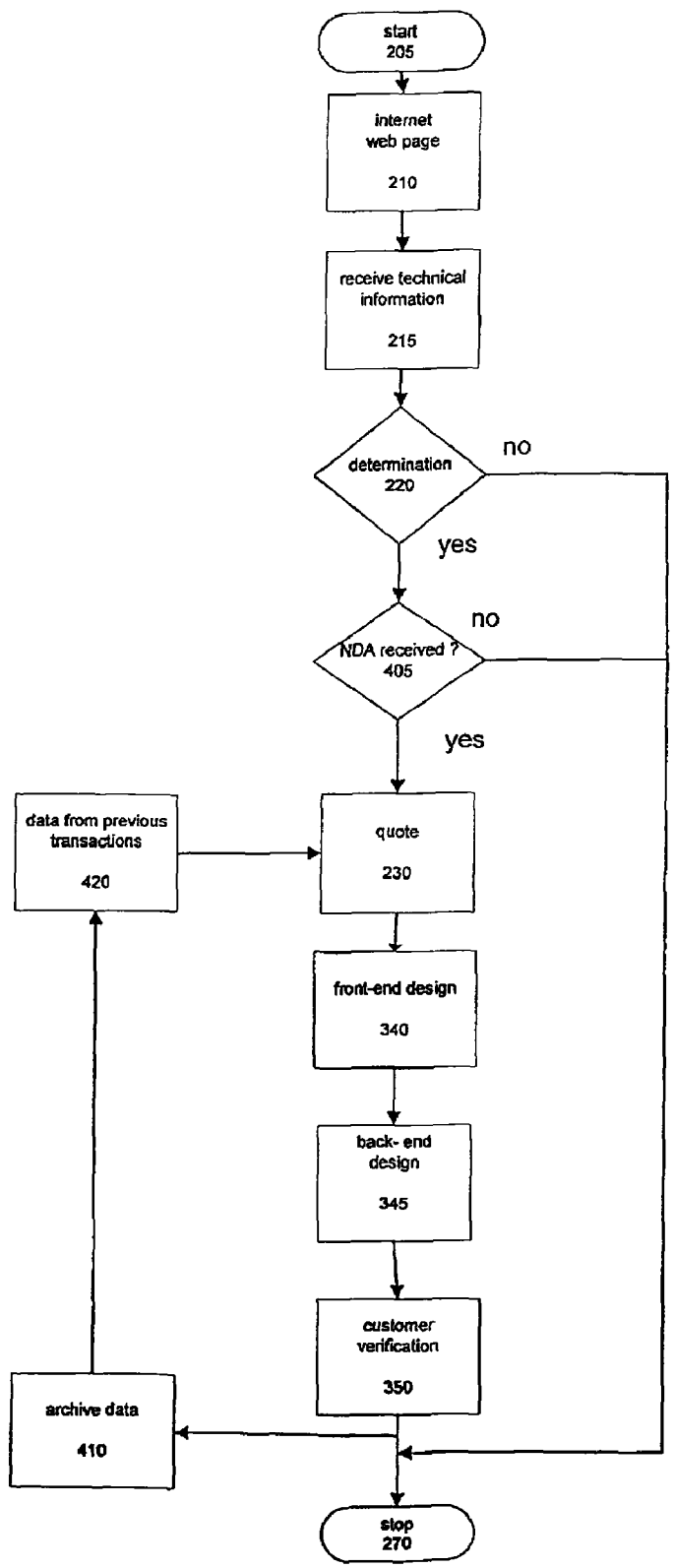
FIG. 4B is a flow diagram of the method depicting the additional logical steps of archiving data and using data from previous transactions to facilitate developing a price quotation.

FIG. 4B is a flow diagram of the method showing the additional logical step of archiving data, 410. From customer verification 350 (previously shown in FIG. 4A) the method can proceed to archive data, 410. For example, communications with a potential customer can be archived. Storing the communication from the potential customer stating the type of product ordered and quantity of product ordered can be useful if a dispute arises. Still referring to FIG. 4B, the method can proceed from archive data 410 to data from previous transactions, 420. Data from previous transactions 420 allows a manufacturer to recall certain data from earlier transactions (such as the quote offered) and base a quote on the data from the earlier transaction. From data from previous transactions 420 the method can proceed to quote 230 (as previously described in FIG. 2.)

Figure 4C:
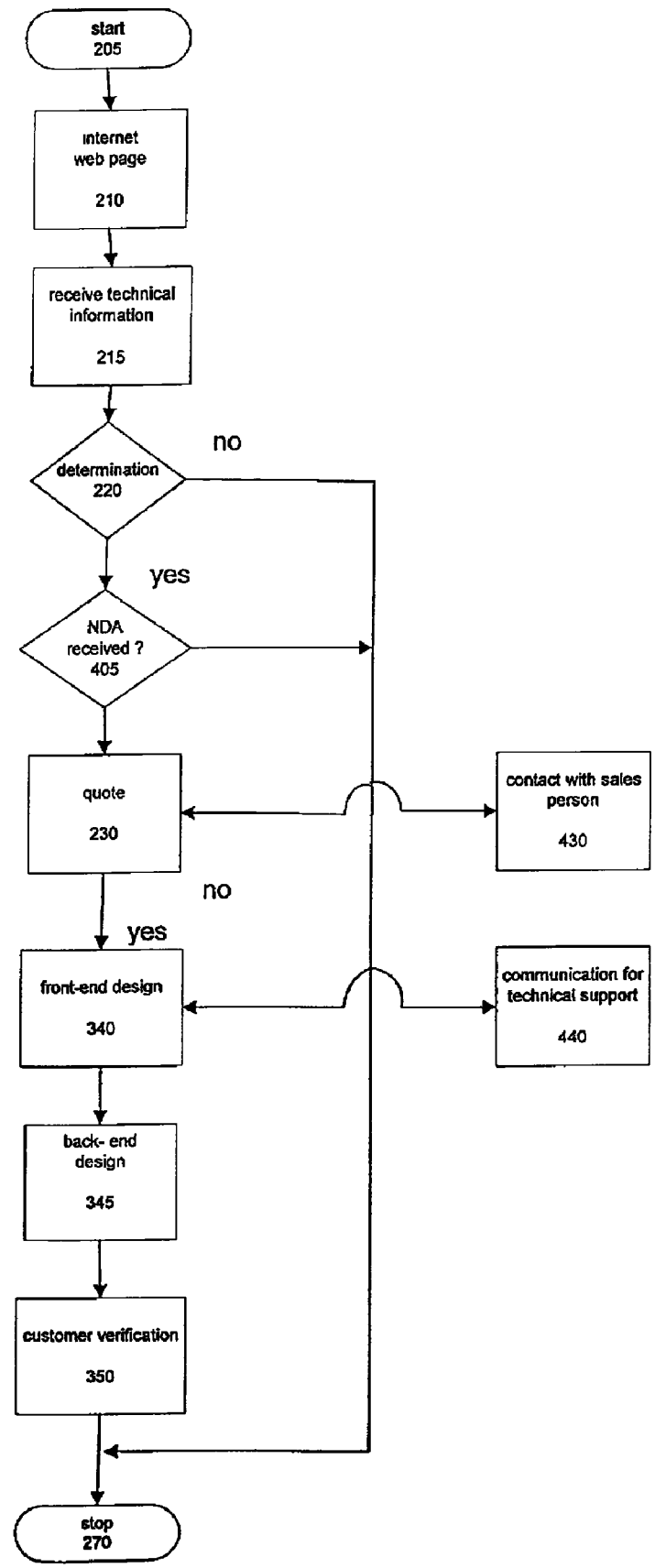
FIG. 4C is a flow diagram of the method depicting the additional logical steps of contact with sales personnel and communication for technical support.

FIG. 4C is a flow diagram of the method depicting the additional logical steps of contact with the sales organization and communication for technical support. Contact with sales organization 430 provides personnel associated with the manufacturer's sales organization sufficient information to provide a price quotation to the customer. For example, a customer may provide a specification for an integrated circuit including the number of gates required, speed, package size and macros. The marketing organization can then communicate with engineering and sales organizations to complete preparation of the price quote. In an embodiment the communication between the sales organization and customer can be through an electronic network, such as the Internet. In the alternative communication between the sales organization and customer can be though an electronic network such as the manufacturer's extranet.

Still referring to FIG. 4C, communication for technical support 440 is shown. Communication for technical support 440 provides the customer with information or instructions to facilitate a customer using a manufacturer's EDA tools to execute a design. A customer can contact the engineering organization to determine the necessary specification to design and manufacture the product desired, such as an integrated circuit chip. In an embodiment the communication between the engineering organization and customer can be through an electronic network, such as the Internet. In the alternative communication between the engineering organization and customer can be though an electronic network such as the manufacturer's extranet.

Figure 5A:
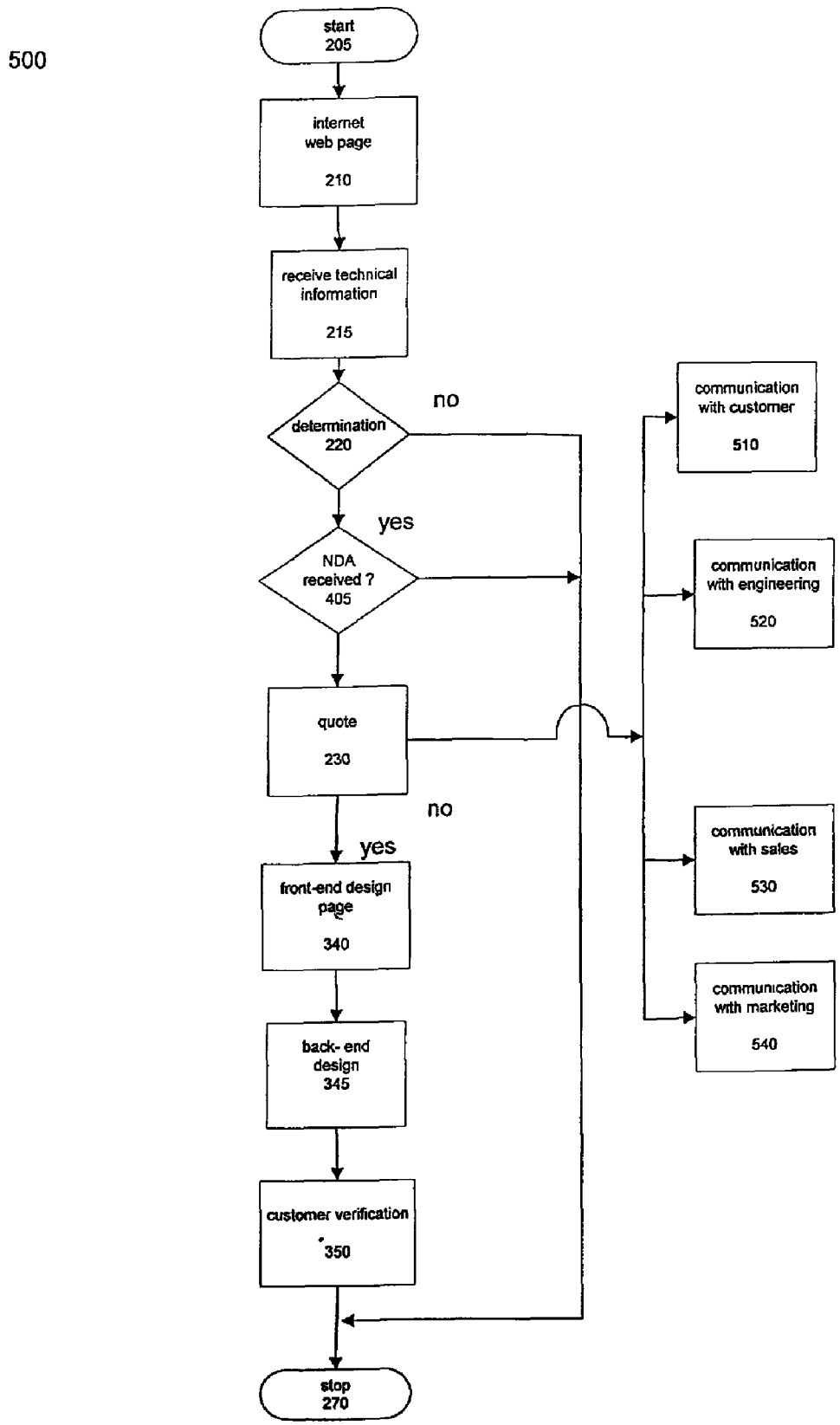
FIG. 5A is a flow diagram of the method depicting the additional logical steps of communication from the manufacturer to the customer, sales, engineering and marketing.

FIG. 5A shows the logical steps of a method including communication with customer 510, communication with engineering 520, communication with sales 530 and communication with marketing, 540. Communication with customer 510 allows a manufacturer to notify a customer when the technical information submitted by the customer (refer to logical step 215) is acceptable to the manufacturer. Communication with engineering 520 allows a manufacturer to notify the manufacturer's engineering organization that sufficient technical information has been received from a customer to allow the customer to proceed to a design step. Communication with sales 530 allows a manufacturer to notify a sales organization that sufficient technical information has been received from a customer to allow the customer to proceed to a design step. Communication with marketing 540 allows a manufacturer to notify the marketing organization that sufficient technical information has been received to allow the customer to proceed to a design step. In an embodiment the communication between the manufacturing organization and customer can be through an electronic network, such as the Internet.

Figure 5B:
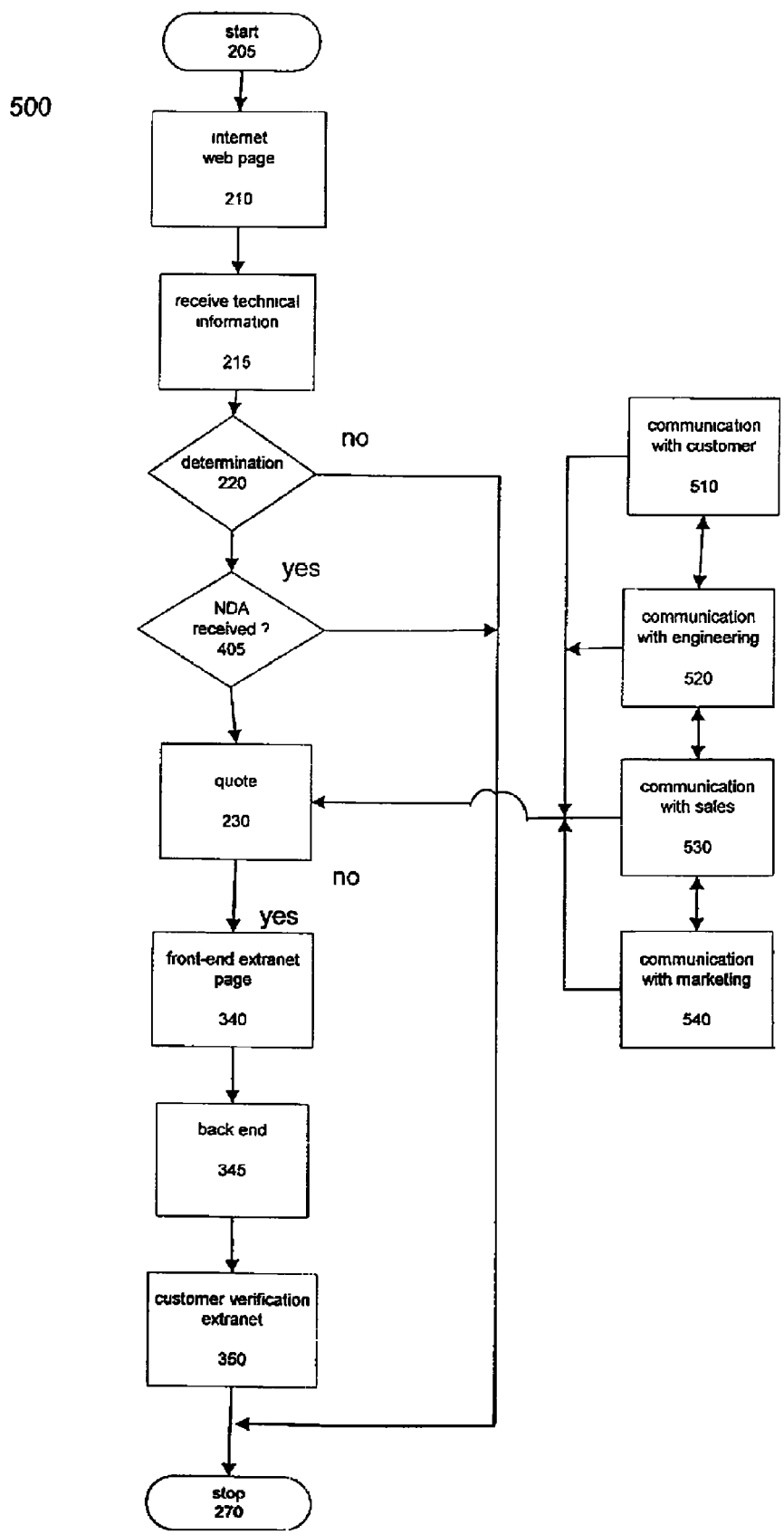
FIG. 5B is a flow diagram of the method depicting the additional logical steps of communication between the manufacturer, customer, sales, engineering and marketing.

FIG. 5B shows communication between the customer, engineering, sales and marketing. For example, as shown, the customer can communicate directly with engineering. Engineering can communicate directly with sales and the sales organization can communicate directly with marketing. Either party to the communication can initiate the communication. In an embodiment the communication between the sales organization and customer can be through an electronic network, such as the Internet. When these communications are electronic, such as over an extranet they can be archived for future reference.

Figure 5C:
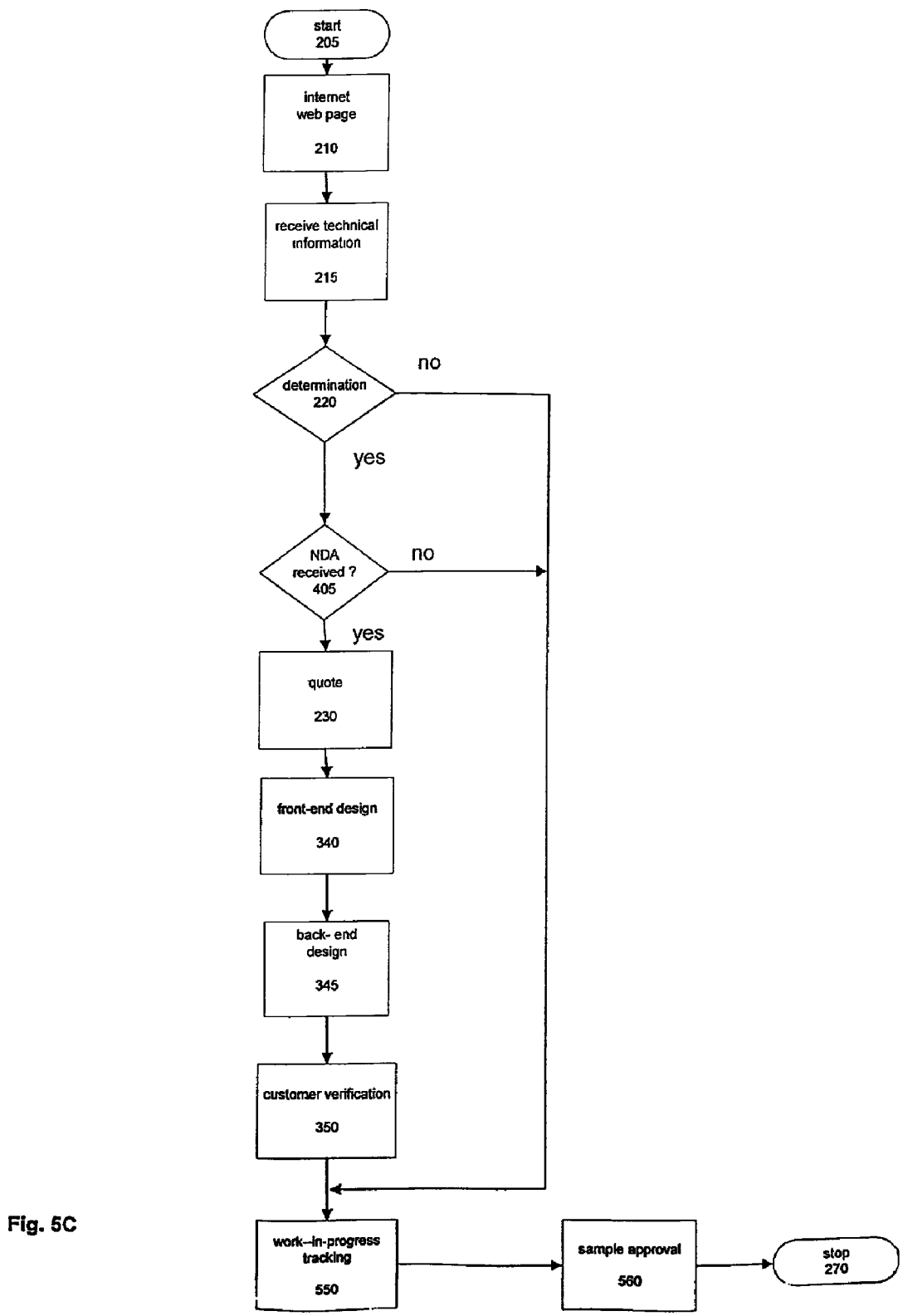
FIG. 5C is a flow diagram of the method depicting the additional logical steps of work-in-progress tracking and sample approval.

FIG. 5C shows the logical steps of a method including work-in-progress tracking 550 and sample approval, 560. Work-in-progress tracking allows a customer to view the status of sample products in the manufacturing process. Work-in-progress tracking 550 can also allow a customer to monitor delivery of orders which have been shipped. Sample approval 560 allows a customer to evaluate a sample to determine if the sample product meets the customer' specifications. Again, these communications can be electronic, such as communications over the Internet or an extranet. When the customer verifies that a sample meets the specifications provided, the method is completed as shown by stop, 270 (previously shown in FIG. 2).

Figure 6:
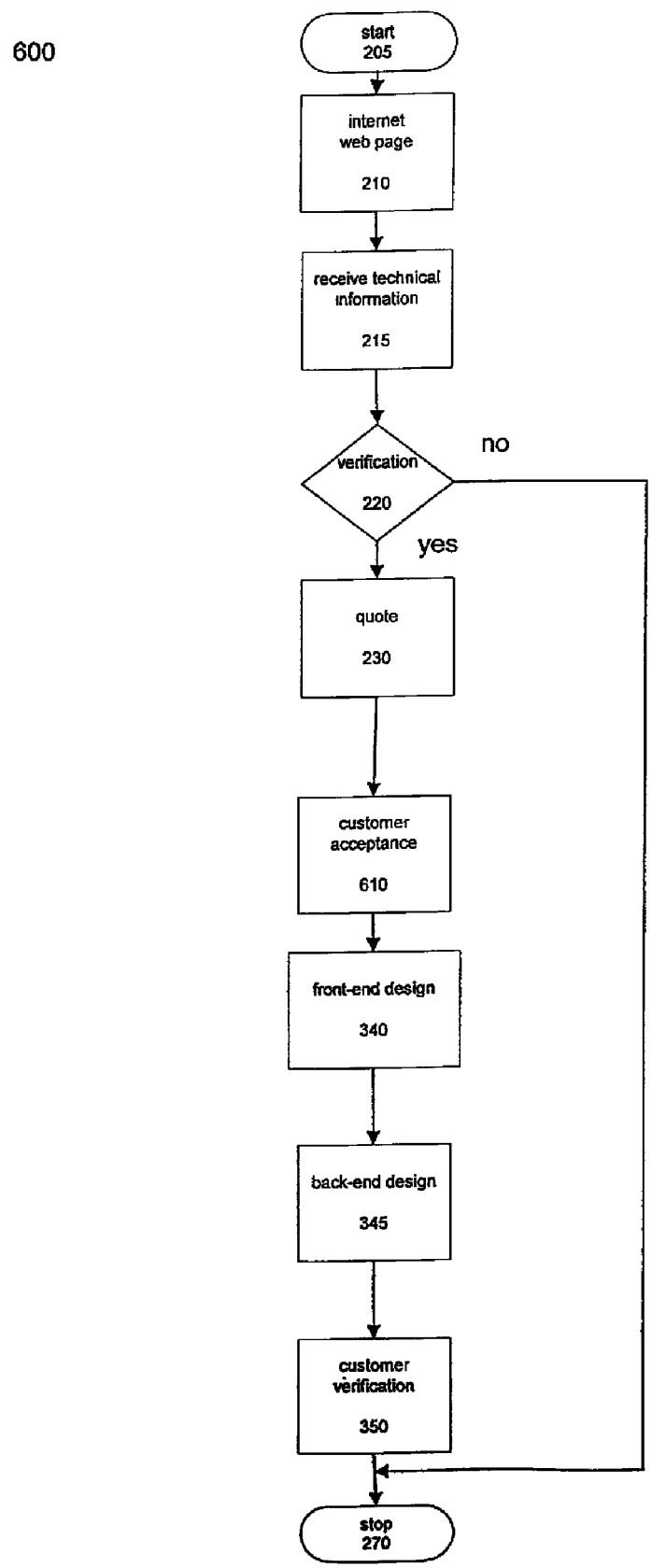
FIG. 6 is a flow diagram of the method including the logical step of the customer accepting the price offered.

FIG. 6 shows the logical steps of a method including an offer and acceptance. As shown in FIG. 6, offer 610 includes the information necessary to enter into a contract with a purchaser. For example, offer 610 can include the following terms; price, quantity and delivery date. Acceptance 620 indicates the customer's agreement of the terms offered in logical step 610. The method proceeds from offer 610 to acceptance 620 when the customer accepts the manufacturers offer. When the method proceeds from offer 610 to acceptance 620 as shown in FIG. 6, a contract for sale results.

Figure 7A:

FIG. 7A and FIG. 7B show a web page suitable to execute the method disclosed. For example, in a configuration as shown in FIG. 7A a customer can enter his company name and address including city, state and zip code. In addition as shown in FIG. 7A a customer can enter contact phone numbers including direct office phone number, general office number, cell number and fax number. As shown in FIG. 7B, a customer can enter a project name and the size of the customer's business. From the information gathered in FIG. 7A and FIG. 7B a potential manufacturer can determine the level of the customer's previous experience with the manufacturer. Format 710 allows a customer to communicate to the manufacturer the forecast demand for the product. From this forecast demand the manufacturer can decide whether or not to pursue the manufacture of the product.

FIG. 8 shows a web page suitable for informing a potential customer of the nature and function of the website. For example a function shown in FIG. 8 refers to "customer inquiry." The function referred to as "customer inquiry" in FIG. 8 has been referred to in greater detail as receive technical information 215 and verification 220 on FIG. 2.

Figure 9A:
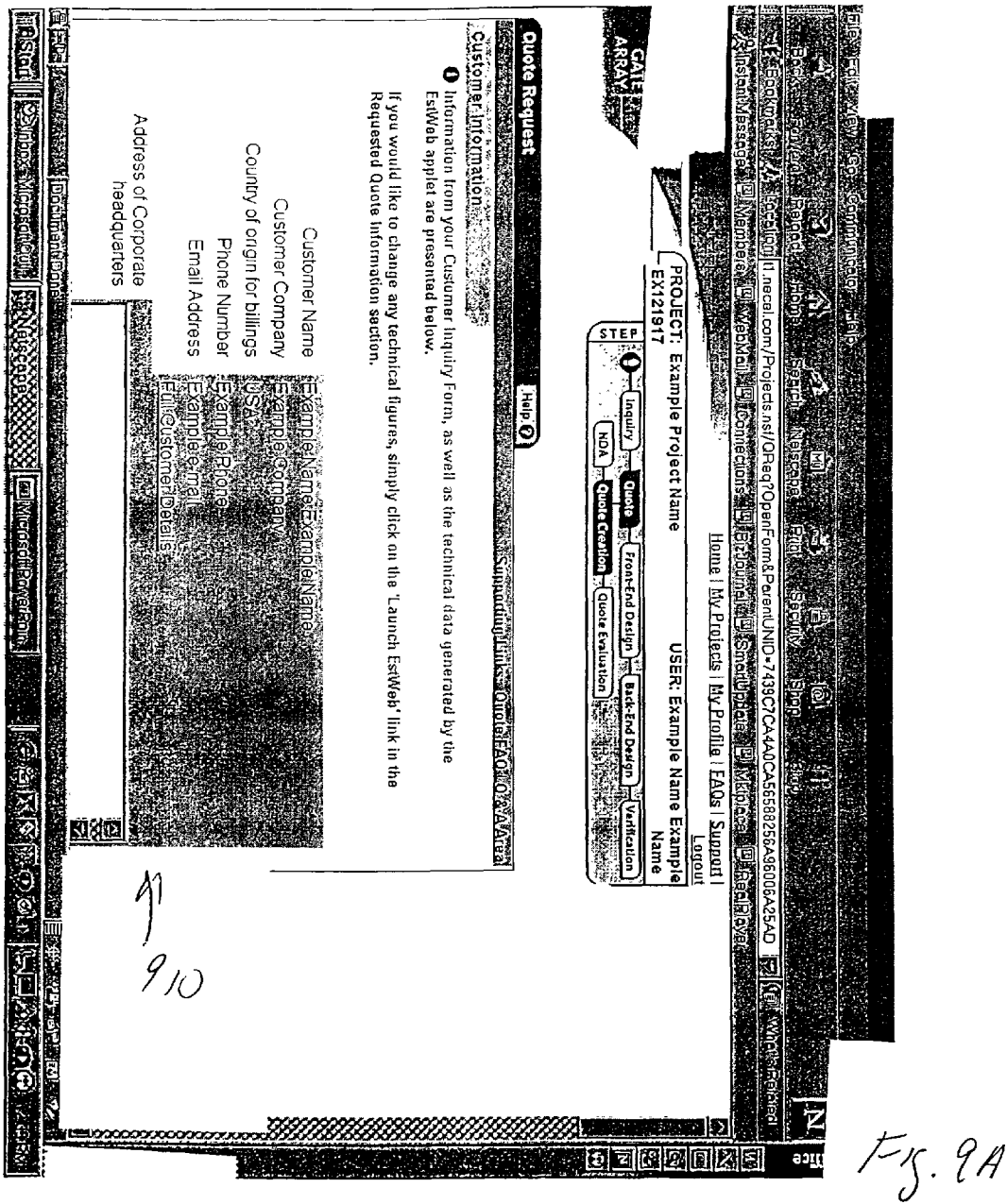
Figure 9B:
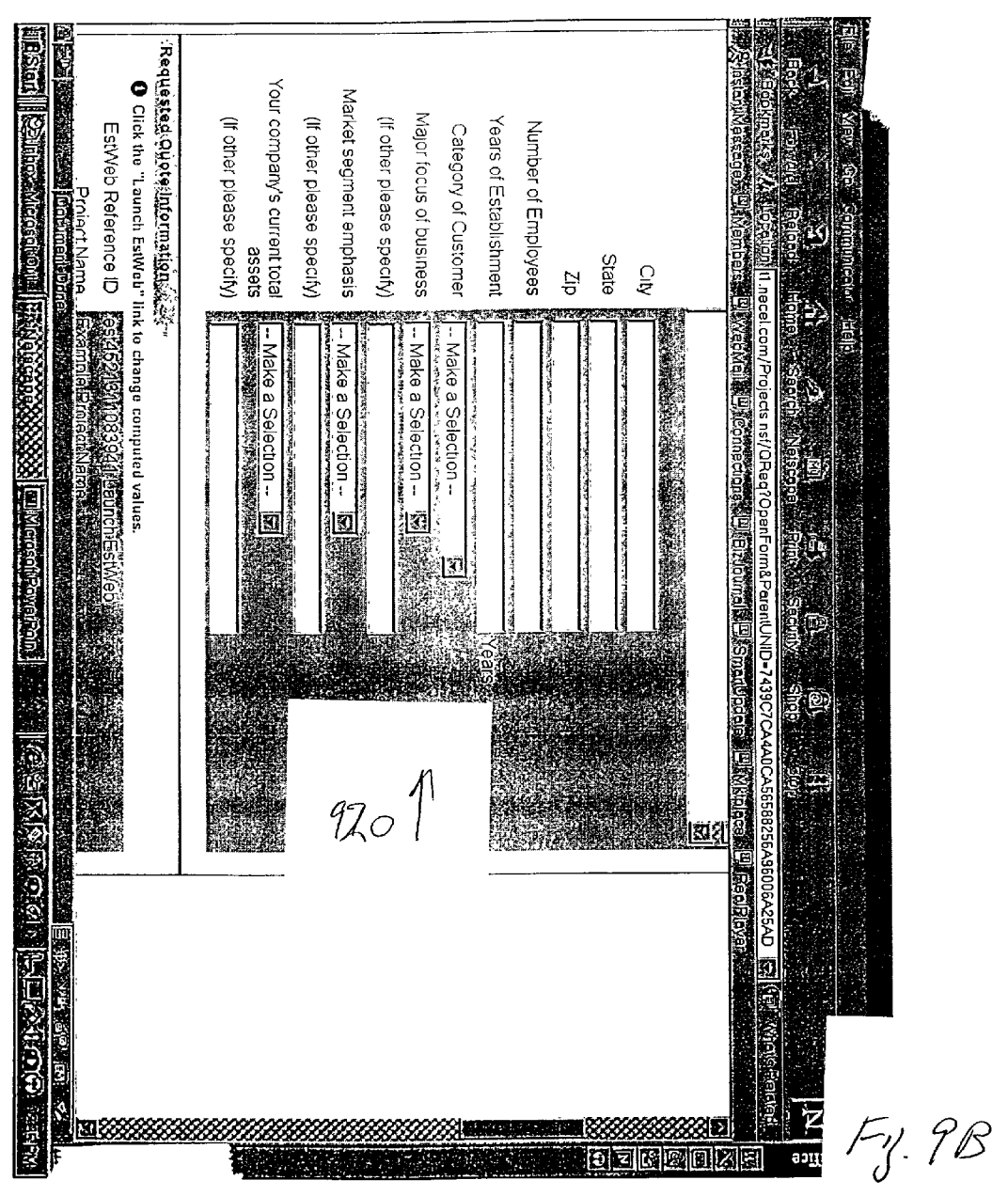
Figure 9C:
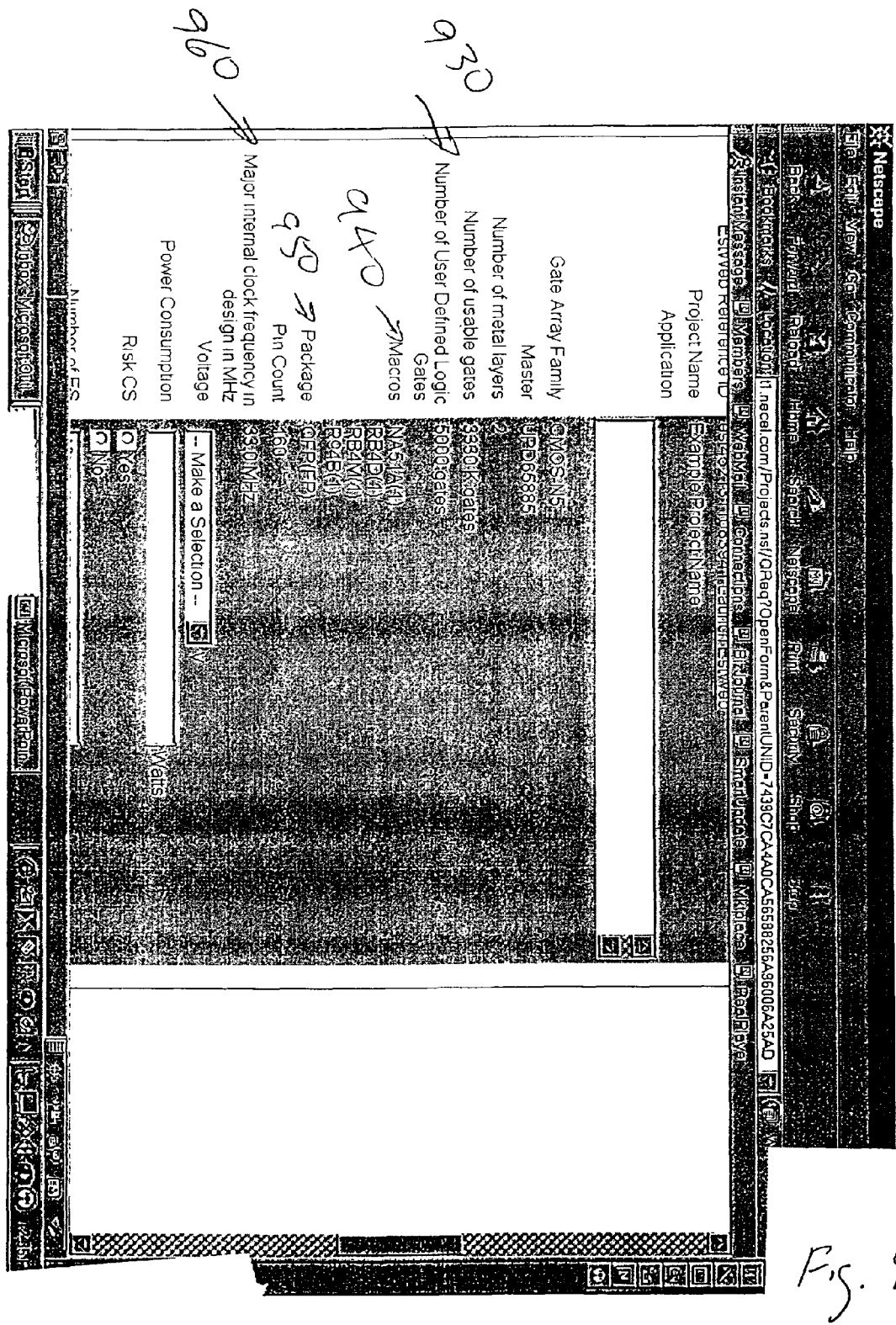
Figure 9D:
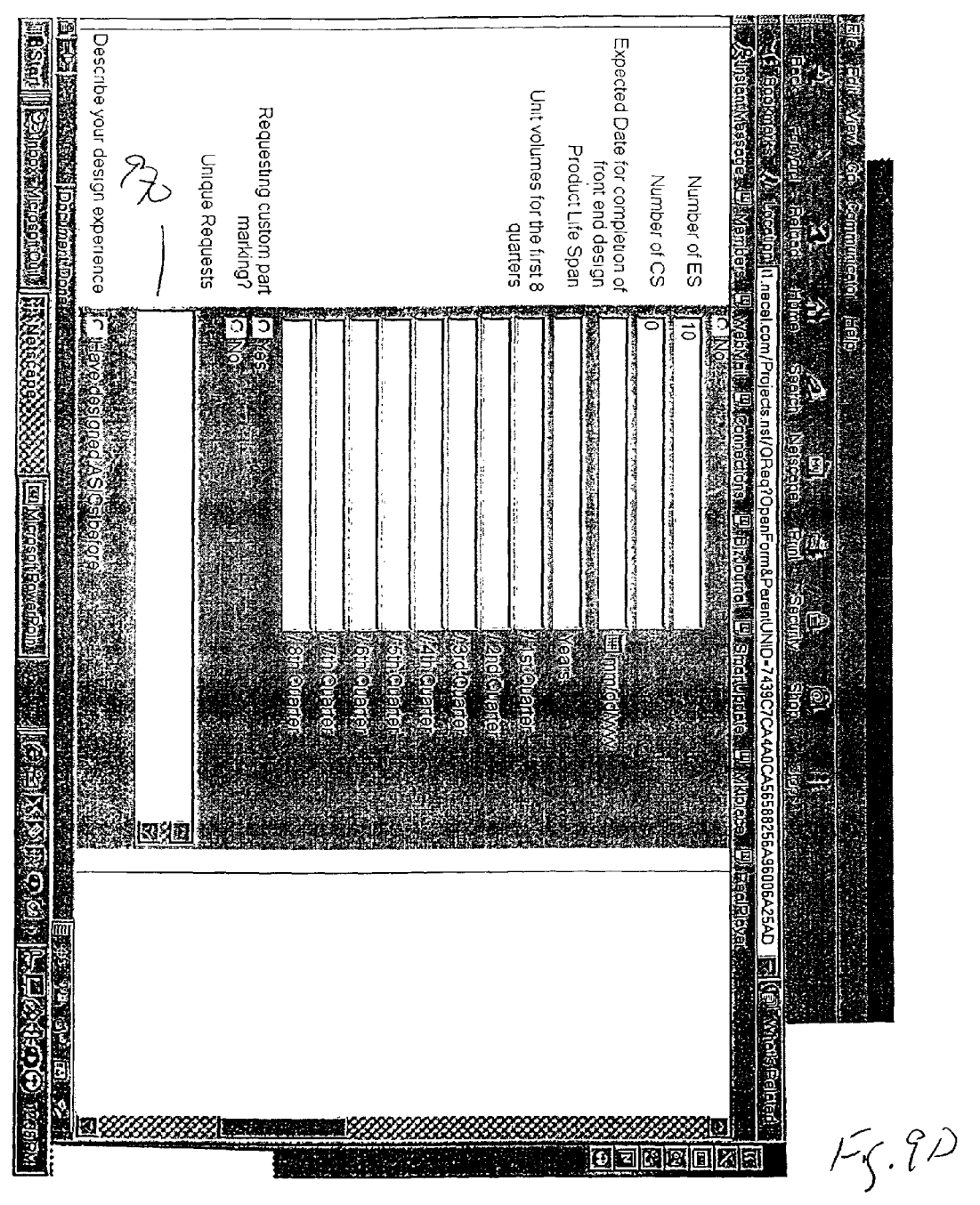
Figure 9E:
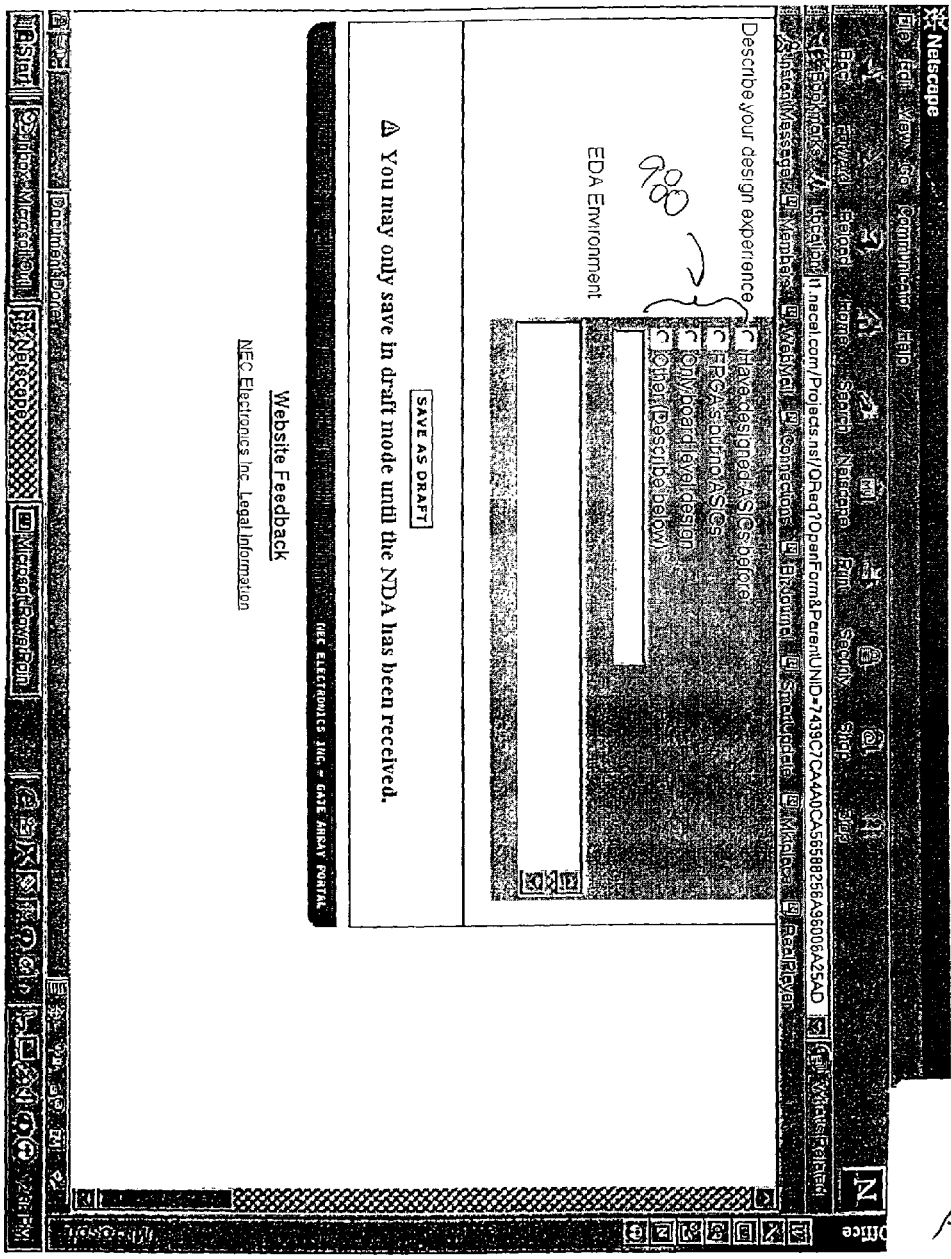

FIGS. 9A-E shows a screen presentation suitable for use by a potential customer in requesting a quote from a potential manufacturer. FIG. 9A provides presentation 910 to enter the name of the potential customer. FIG. 9B provides presentation 920 to enter the address of the potential customer. FIG. 9C provides presentation 930 to enter the number of user defined gates, presentation 940 to enter the number and type of macros and presentation 950 to enter the package. (The package defines the physical interface between the die and the printed circuit board.) FIG. 9C also provides presentation 960 to enter the major internal clock frequency, also known as the operating speed. FIG. 9D allows a potential customer to enter a quantity forecast. The forecast quantity can be entered by the first quarter, second quarter, etc of a given year. FIG. 9D also allows a potential customer to enter unique requests, 970. FIG. 9E provides presentation 980 to allow a potential customer to inform the potential manufacturer of the customer's design experience.

AN EMBODIMENT

In an embodiment the prices provided are for integrated circuit chips. More specifically the product for which a manufacturer provides a price can be an integrated circuit chip known as a gate array. Gate arrays are a sea-of-gates with fixed pre-fabricated arrays. Pre-fabricated arrays are derived from a master die. Deriving a pre-fabricated array from a master die allows manufacture in large quantities. Manufacture in large quantity reduces prices.

Gate arrays are interconnected during the final metalization step in the fabrication process. Interconnecting gate arrays during the final metalization step is an efficient process. Therefore the gate arrays can be manufactured in less time and with less lead time than some RI other integrated circuit chips. Using a website to receive specifications and provide a price quotation further reduces the time required for a vendor to provide a finished product.

CMOS gate arrays can contain from 3,000 gates to 1.5 million gates. Gate arrays are power efficient. A website capable of providing a design-specific price quotation facilitates meeting this market demand for gate arrays and other integrated circuit chips.

The method disclosed is not restricted to a specific software, software language or software architecture. Each of the steps of the method disclosed may be performed by a module (e.g., a software module) or a portion of a module executing on a computer system. Thus, the above component organization may be executed on a laptop, desk top or other computer system. The method may be embodied in a machine-readable and/or computer-readable medium for configuring a computer system to execute the method. Thus, the software modules may be stored within and/or transmitted to a computer system memory to configure the computer system to perform the functions of the module.

It is appreciated that operations discussed herein may include, for example, directly entered commands by a computer system user, steps executed by application specific hardware modules, steps executed by software modules, or combinations thereof.

The software modules discussed herein which perform the described steps may include script, batch or other executable files, or combinations and/or portions of such files. The software modules may include software code as well as data and may be encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described herein are for illustration only. Operations may be combined or the functionality of the operations may be distributed in additional operations in accordance with the invention.

The operations described above and modules therefor may be executed on a computer system configured to execute the operations of the method and/or may be executed from computer-readable media. The method may be embodied in a machine-readable and/or computer-readable medium for configuring a computer system to execute the method. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims.

What is claimed is:

1. A method comprising:
    a first computer system receiving a request to access integrated circuit pricing information from a second computer system in data communication with the first computer system via the Internet, wherein the integrated circuit pricing information is stored in memory coupled to the first computer system;
    the first computer system receiving first information identifying an entity; and
    the first computer system comparing the first identifying information with a list of identifying information stored in memory;
    the first computer system denying the second computer system access to integrated circuit pricing information stored in memory if the first identifying information compares equally to identifying information contained in the list.

2. The method as recited in claim 1, further comprising:
    the first computer system receiving information relating to a non-disclosure agreement from the entity via the second computer system.

3. The method as recited in claim 1, wherein the first identifying information comprises a name of the entity, a mailing address for the entity, or a phone number for the entity.

* * * * *